Oct. 23, 1962 R. S. DANFORTH 3,059,339
NAVIGATIONAL DEVICE
Filed May 4, 1959 2 Sheets-Sheet 1
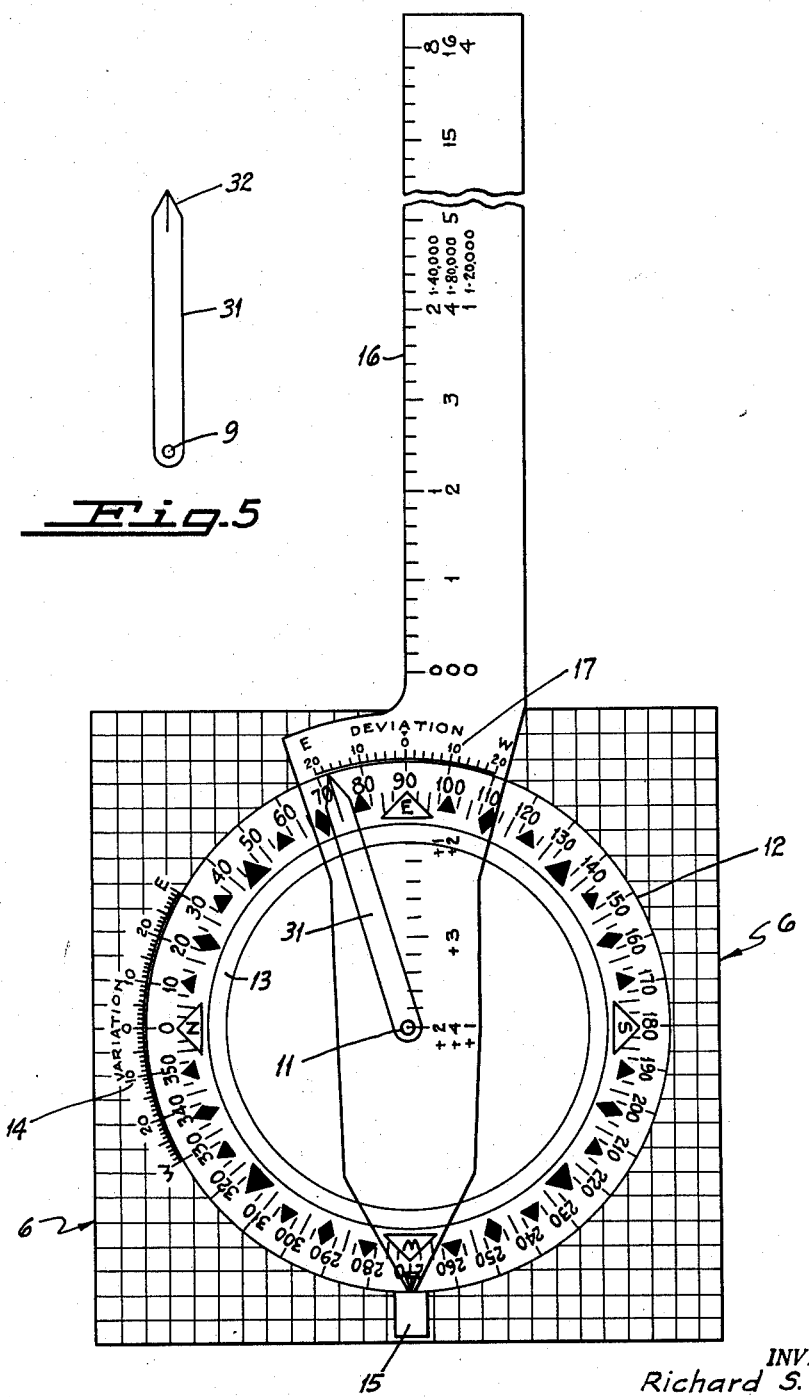
INVENTOR.
Richard S. Danforth
ECKHOFF & SLICK
ATTORNEYS
BY
A member of the firm Oct. 23, 1962 R. S. DANFORTH 3,059,339
NAVIGATIONAL DEVICE
Filed May 4, 1959 2 Sheets-Sheet 2
Fig.4
Fig.3
Fig.2
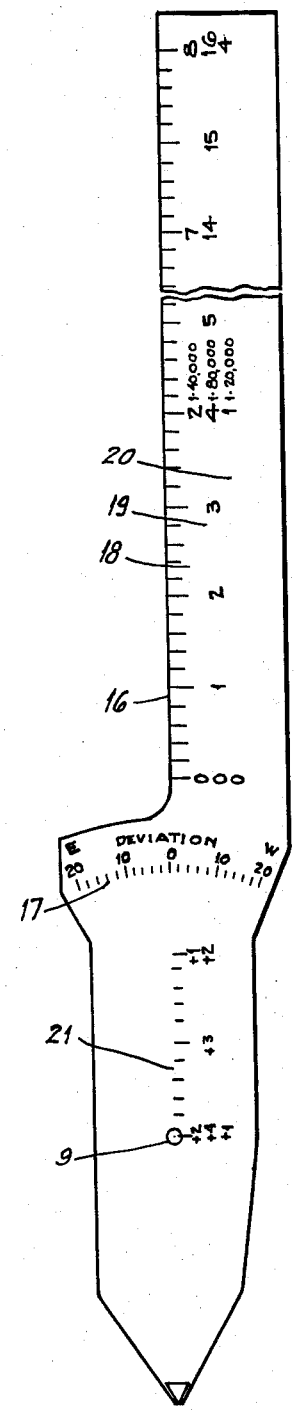
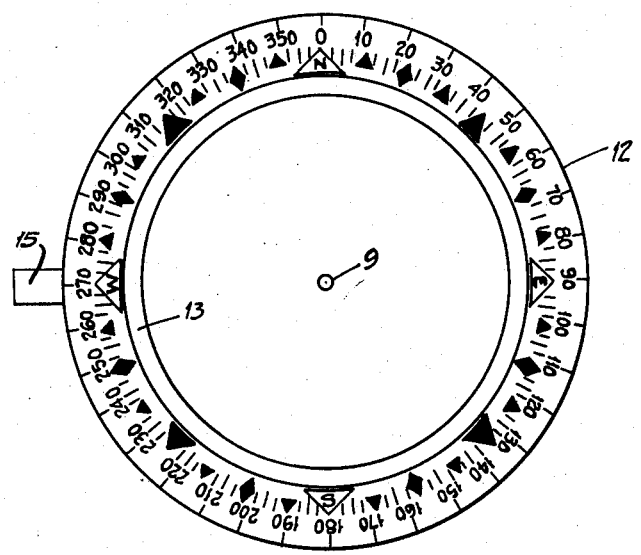
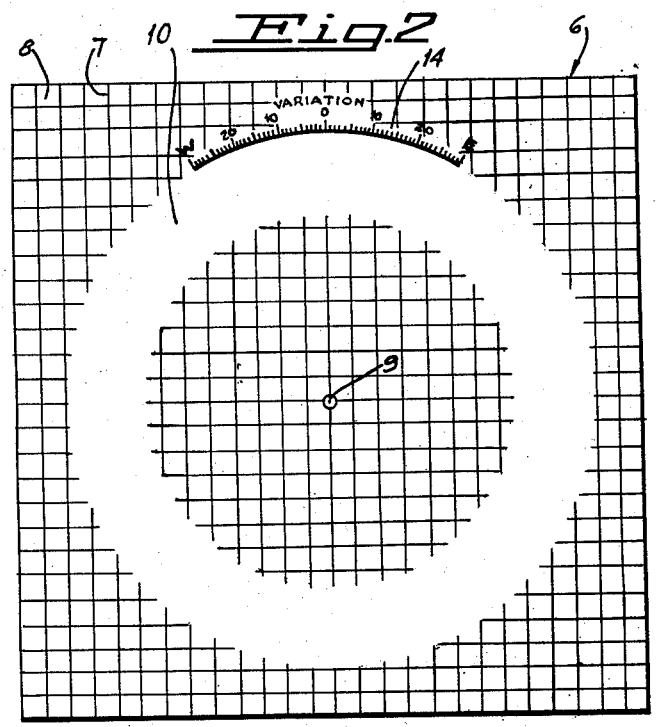
INVENTORS
Richard S. Danforth
ECKHOFF & SLICK
ATTORNEYS
BY
A member of the firm

United States Patent Office 3,059,339
Patented Oct. 23, 1962

3,059,339
NAVIGATIONAL DEVICE
Richard S. Danforth, Berkeley, Calif., assignor to The Eastern Company, a corporation of Connecticut
Filed May 4, 1959, Ser. No. 810,646
4 Claims. (Cl. 33—76)

This invention relates to a new and improved navigation protractor enabling one to take into account local magnetic variation correction factor and the deviation correction factor peculiar to the craft being navigated. The device of the present invention is so fashioned that the variation can be set semi-permanently in the device to remain in such position until one must employ another variation.

It is in general the broad object of the present invention to provide an improved navigational aid device.

The present best embodiment of the invention known to me is that disclosed hereinafter. It is, of course, subject to modification within the scope of the appended claims. In the drawings accompanying and forming a part hereof, FIGURE 1 is a plan view showing the assembled device, while FIGURES 2, 3, 4 and 5 are, respectively, plan views of the several parts of the device.

The device includes a base 6 (FIGURE 2) of a transparent, flexible material. One surface of the base is marked off with two sets of parallel lines 7 and 8 extending normal to each other so that the device may be readily brought into an aligned position on a chart. The base includes a central opening 9 for insertion of rivet 11, securing the base to the several presently described parts.

The base also includes an unruled circular area 10 over which a circular rose 12 is movable by handle 15. The rose is calibrated and carries both compass markings in degrees and the points of the compass. The rose includes an area 13 to which pencil or ink markings may be applied so that notations of the deviations corresponding to various courses may be made semi-permanently on the rose.

The rose is secured in position on the base 6 by the rivet 11 and is only movable over the base with some effort. The base is also marked off in degrees, as at 14, to provide for incorporation of the applicable magnetic variation correction.

Mounted upon the rose to turn loosely on rivet 11 is an arm 16. This includes a marking in degrees of deviation, as at 17, to cooperate with the markings on the rose. The arm also includes three distance scales along the length thereof, as at 18, 19 and 20, each of a different value, so that the arm can be used to read distance in accordance with the scale to which the chart is prepared. A supplementary distance scale 21 is also provided, extending from the center about which the several parts rotate.

Mounted on top of the arm 16 is a deviation indicator arm 31 also rotatable about the rivet 11 and having a pointed end 32 cooperatively adjacent the deviation scale 17 on arm 16. If there is a deviation, then the arm 31 is set to the value of the deviation on scale 17 and that setting is then read against the compass rose to give the course reading.

In the device shown in FIGURE 1, the several parts are shown at a 0° variation and an 18.5° easterly deviation. To use the device, the four parts being assembled as in FIGURE 1, if the craft undergoing navigation is one in which the compass has no error so that no deviation is present, and if the area for which the chart is applicable is subject to a variation of 18° East, then the zero on the rose 12 is set to 18° East on the variation scale. The reading of the center line of the arm 16 against the compass circle on the rose 12 will then actually be the reading for the compass course; in fact the rose will correspond to the compass card, assuming that no deviation is inherent in the craft undergoing navigation.

When the device has once been set for the proper variation, this setting can remain on the device so long as the chart in question is in use. In this way, one need not constantly check the variation. Further, one is assured that, once having set it correctly, it will remain so set and one will not inadvertently, for example, as has happened, apply a westerly variation when, in fact, it should be easterly. If there is an error inherent in the compass due to extraneous magnetic forces peculiar to the craft on which the compass is mounted, the extent of this error can be corrected by using the deviation scale 17 on the arm 16. Arm 31 can be set opposite the deviation correction and this setting is then used to read the corrected compass course; in the device shown in FIGURE 1, this setting is 18.5° East. The deviation correction can also be written on the area 13 for all the courses.

The rose 12 can be laid out with great accuracy and is therefore much more reliable than some of the compass card reproductions which are printed on some charts.

I claim:

1. A navigation device comprising a flat transparent member having crossed lines marked in one face thereof for aligning the member on a chart, a circular rose calibrated about the periphery thereof, a variation scale marked in the member cooperatively adjacent the periphery of the rose, an arm providing a straight edge for projection of a course on a chart, a deviation scale marked on the arm cooperatively adjacent the periphery of the rose, and means mounting the rose, arm and member for rotation relative to one another.

2. A navigation device comprising a flat transparent member having crossed lines marked in one face thereof for aligning the member on a chart, a circular rose calibrated about the periphery thereof, a variation scale marked in the member cooperatively adjacent the periphery of the rose, an arm providing a straight edge for projection of a course on a chart, a deviation scale marked on the arm cooperatively adjacent the periphery of the rose, and means mounting the rose and arm for rotation on the member with the rose tightly held against rotation to enable its setting to be maintained and with the arm readily movable over the rose.

3. A navigation device comprising a flat transparent member having crossed lines marked in one face thereof for aligning the member on a chart, a circular rose calibrated about the periphery thereof, a variation scale marked on said arm cooperatively adjacent the periphery riphery of said rose, an arm providing a straight edge for projection of a course on a chart, a deviation scale marked on said arm cooperatively adjacent the periphery of said rose, the interior surface of said rose being adapted to receive a marking of compass deviation, and means mounting said rose and arm for rotation on said member.

4. A navigation device comprising a flat base, a circular rose calibrated about the periphery thereof, a variation scale marked on said base cooperatively adjacent said periphery of said rose, an arm providing a straight edge for projection of a course on a chart, a deviation scale on said arm cooperatively adjacent said rose, and means mounting said rose and arm for rotation on said base.

References Cited in the file of this patent

UNITED STATES PATENTS

| | | |
|---|---|---|
| 1,108,517 | Potter | Aug. 25, 1914 |
| 1,292,337 | Lindberg | Jan. 21, 1919 |
| 2,238,190 | Sawtelle | Apr. 15, 1941 |
| 2,904,885 | Wood | Sept. 22, 1959 |

FOREIGN PATENTS

| | | |
|---|---|---|
| 38,656 | Sweden | Apr. 14, 1915 |
| 58,278 | Norway | Dec. 2, 1940 |
| 581,013 | Great Britain | Sept. 27, 1946 |